(12) United States Patent
Aeberhard et al.

(10) Patent No.: US 9,380,908 B2
(45) Date of Patent: Jul. 5, 2016

(54) MILK-FROTHING APPARATUS, AND COFFEE OR ESPRESSO MACHINE AND AUTOMATIC BEVERAGE VENDING MACHINE HAVING A MILK-FROTHING APPARATUS OF THIS KIND

(75) Inventors: Bruno Aeberhard, Zuchwill (CH); Peter Egli, Herrenschwanden (CH); Bruno Mosimann, Burgdorf (CH); André Lüssi, Jegenstorf (CH)

(73) Assignee: SCHAERER AG, Zuchwil (CH)

( * ) Notice: Subject to any disclaimer, the term of this patent is extended or adjusted under 35 U.S.C. 154(b) by 243 days.

(21) Appl. No.: 14/352,388

(22) PCT Filed: Aug. 16, 2012

(86) PCT No.: PCT/EP2012/066011
§ 371 (c)(1),
(2), (4) Date: Jun. 18, 2014

(87) PCT Pub. No.: WO2013/056871
PCT Pub. Date: Apr. 25, 2013

(65) Prior Publication Data
US 2014/0327162 A1    Nov. 6, 2014

(30) Foreign Application Priority Data

Oct. 21, 2011  (DE) .................... 20 2011 051 719 U
Mar. 9, 2012   (CH) ........................................ 342/12

(51) Int. Cl.
*B01F 3/04*     (2006.01)
*A47J 31/44*    (2006.01)
(Continued)

(52) U.S. Cl.
CPC .............. *A47J 31/4485* (2013.01); *A23C 9/00* (2013.01); *A47J 31/44* (2013.01); *B01F 3/04* (2013.01); *B01F 3/04446* (2013.01); *B01F 5/0275* (2013.01); *B01F 2215/0006* (2013.01)

(58) Field of Classification Search
CPC ............... B01F 3/04; A47J 31/44; A23C 9/00
USPC .................... 99/323.1; 426/474; 261/34.1, 76
See application file for complete search history.

(56) References Cited

U.S. PATENT DOCUMENTS 5,189,949 A    3/1993  Apa
5,312,020 A    5/1994  Frei
(Continued)

FOREIGN PATENT DOCUMENTS

DE    8907183 U1   7/1989
DE    4137324 C1   2/1993
(Continued)

OTHER PUBLICATIONS

International Search Report dated Oct. 22, 2012 for PCT/EP2012/066011.

*Primary Examiner* — Robert A. Hopkins
(74) *Attorney, Agent, or Firm* — Pearne & Gordon LLP

(57) ABSTRACT

The invention relates to a milk-frothing apparatus, in particular for a coffee or espresso machine, comprising a froth-generating unit (22) which is in the form of a disposable part, which is easy to replace, and has a mixing chamber (40), an outlet (39), which leads to the outside from the mixing chamber (40), for the generated milk froth, and first means (42) through which the froth-generating unit (22) is supplied with steam and air (53), and also second means (43) through which the froth-generating unit (22) is supplied with milk, wherein the froth-generating unit (22) can be connected to a holding means (30) in a detachable manner. The froth-generating unit (22) can be replaced in a simple and reliable manner while at the same time operating in a flexible manner by the first means comprising a first inlet (42) through which steam and air enter the froth-generating unit (22) together, by a combined steam/air nozzle (33), which projects outward and is connected to a steam generator and an air pump and through which steam and air are routed together, being provided on the holding means (30), and by the first inlet (42) and the steam/air nozzle (33) being designed and matched to one another such that they form a detachable hydraulic plug connection.

18 Claims, 7 Drawing Sheets

(51) Int. Cl.
    *A23C 9/00*    (2006.01)
    *B01F 5/02*    (2006.01)

(56) References Cited

U.S. PATENT DOCUMENTS

| | | | |
|---|---|---|---|
| 8,444,016 B2 * | 5/2013 | Lussi | A47J 31/40 222/129.4 |
| 2002/0134248 A1 | 9/2002 | Eugster | |
| 2006/0230943 A1 | 10/2006 | Stieger et al. | |
| 2009/0214742 A1 | 8/2009 | Peden et al. | |
| 2010/0162898 A1 | 7/2010 | Mahlich | |
| 2011/0311694 A1 * | 12/2011 | Broennimann | A47J 31/4485 426/474 |

FOREIGN PATENT DOCUMENTS

| | | |
|---|---|---|
| DE | 20102048 U1 | 1/2002 |
| DE | 102004025037 A1 | 12/2005 |
| DE | 202007008814 U1 | 11/2007 |
| DE | 202011051719 U1 | 3/2012 |
| EP | 0373985 A1 | 6/1990 |
| EP | 0820715 A1 | 1/1998 |
| EP | 1626375 A1 | 2/2006 |
| EP | 2011421 A1 | 1/2009 |
| EP | 2011422 A1 | 1/2009 |
| EP | 2078481 A1 | 7/2009 |
| EP | 2189085 A1 | 5/2010 |
| EP | 2198762 A1 | 6/2010 |
| EP | 2220972 A1 | 8/2010 |
| WO | 9302605 A1 | 2/1993 |
| WO | 2006090183 A2 | 8/2006 |
| WO | 2009027259 A2 | 3/2009 |
| WO | 2009056426 A1 | 5/2009 |
| WO | 2009130099 A1 | 10/2009 |
| WO | 2009140349 A2 | 11/2009 |
| WO | 2011139151 A1 | 11/2011 |

* cited by examiner

MILK-FROTHING APPARATUS, AND COFFEE OR ESPRESSO MACHINE AND AUTOMATIC BEVERAGE VENDING MACHINE HAVING A MILK-FROTHING APPARATUS OF THIS KIND

TECHNICAL FIELD

The present invention relates to the field of coffee or espresso machines or automatic beverage vending machines. Said invention relates to a milk-frothing apparatus as claimed in the preamble of claim 1.

Said invention further relates to a coffee or espresso machine and to an automatic beverage vending machine having a milk-frothing apparatus of this kind.

PRIOR ART

Coffee machines or espresso machines or automatic beverage vending machines which discharge freshly brewed coffee beverages generally have the option of heating and/or frothing milk in order to prepare, for example, a cappuccino or latte macchiato or another mixed beverage containing milk.

In this case, the milk froth can be generated externally by means of a steam lance which is arranged on the machine and which is dipped into an external vessel, which contains milk, and heats the milk by virtue of the jet of steam emerging from the lance and froths said milk by admixing it with air.

However, an internal milk-frothing apparatus is often also provided within the machines, milk from a separate milk container being introduced into a mixing chamber in said internal milk-frothing apparatus by said milk being drawn in by suction or pumped, and said milk being heated and frothed with steam and air being supplied. The generated milk froth is then dispensed to the outside.

One problem with this internal generation of milk froth is the contamination of the machine parts involved (mixing chamber, milk line etc.) with the milk. In order to prevent the decomposition of residues of milk in the machine having adverse effects in respect of taste and/or hygiene, it is necessary to regularly and reliably remove any residues of milk from the machine.

Therefore, special cleaning apparatuses and regulations which prevent contamination of the machine by residues of milk are generally provided for machines of this kind. It is feasible, in this case, to rinse the machine parts which are exposed to milk at specific time intervals or each time milk froth is prepared.

However, it is also feasible to design certain machine parts to be removable and to remove said machine parts at certain intervals, to clean said machine parts externally and to reinstall said machine parts.

It is immediately obvious that cleaning apparatuses and processes of this kind are complex, require considerable care by the operator in order to be successful and require a considerable amount of time and therefore lead to undesirable relatively long downtimes of the machine.

EP 1 578 236 B1 now proposes a nozzle for frothing milk which can be fitted to the steam outlet of a coffee machine, is in the form of a disposable part and is formed by joining two mirror-inverted shells which are injection-molded from plastic and welded to one another. The nozzle has a mouth for the entry of steam, a constricted portion as an extension to the mouth and, perpendicular to the mouth, a line for the entry of the milk, and an air inlet which comprises a line which issues into the line for the milk.

One disadvantage of this external solution which operates using an existing steam lance is that the air is introduced directly into the milk in a passive manner by being drawn in by suction, and therefore separate open-loop or closed-loop control of the supply of air is virtually impossible. Secondly, no special fastening options for the nozzle are disclosed, and therefore reliable operation and replacement of the nozzle is not ensured.

EP 1 746 920 B1 discloses an apparatus for frothing milk, having an external milk intake line as an auxiliary device for connection to the steam supply line, which is provided with a steam nozzle, of espresso machines or similar domestic machines, wherein the apparatus is equipped with a nozzle arrangement which is provided for generating negative pressure in a negative-pressure chamber by means of the flow of steam, and has intake lines, which are separately or jointly routed and are connected to the negative-pressure chamber, for milk and air or a milk/air mixture, and a dispensing opening for dispensing the generated steam/milk/air mixture, and the milk intake line can be dipped into the milk which is to be treated and which is located in the container which is provided for accommodating the steam/milk/air mixture or in a separate container.

This known apparatus is at least made up of a permanent part, which can be connected to the steam supply line with a steam nozzle, and a disposable part, which can be connected to said permanent part such that it can be easily exchanged. The disposable part comprises at least a nozzle arrangement, which is arranged in the region of the permanent part and has a negative-pressure chamber and intake lines, and also a milk intake pipe and a milk-froth discharge pipe, wherein at least the two pipes are substantially in the form of thin-walled plastic pipes which can be produced by extrusion This external solution also provides a mixture of air, which is drawn in by suction, with milk before steam is introduced and therefore has the same disadvantages as the solution described previously.

EP 2 189 085 A1 teaches an arrangement for frothing milk in an automatic hot beverage machine, which arrangement has a frothing unit, a hot steam generator which is connected to the frothing unit by means of a first supply line for supplying hot steam, and also a milk delivery device which supplies the frothing unit with milk, which is to be frothed, from a milk storage container by means of a second feed line using a peristaltic pumping device which can be fitted on the second supply line, wherein the milk and the hot steam are mixed in the frothing unit, with the supply of ambient air, to form milk froth.

The arrangement is distinguished in that the second supply line is permanently connected to the frothing unit, in that the hot steam and the ambient air are supplied to the frothing unit together by means of the first supply line, and in that the frothing unit can be removed from the automatic beverage machine together with the second supply line as one unit. In addition, a beverage supply channel for supplying a beverage which can be mixed with the milk froth runs through the arrangement.

One disadvantage of this solution is, primarily, the complex combination of milk froth generation means and beverage supply with coffee outlet in one physical unit. Firstly, this results in a relatively high material requirement, and secondly both the steam hose and also the coffee hose have to be disconnected in the event of exchange. The fact that the frothing unit and the milk supply line should be manufactured from the same material can also be considered to be disadvantageous in respect of a lack of flexibility.

DE 10 2005 010 600 A1 discloses, as a further-reaching, external solution, an apparatus for frothing milk as an auxiliary device for connection to the steam supply line, which is provided with a steam nozzle, of espresso machines or similar domestic machines, wherein the apparatus is equipped with a nozzle arrangement which is provided for generating negative pressure in a negative-pressure chamber by means of the flow of steam, and has intake lines, which are separately or jointly routed and are connected to the negative-pressure chamber, for milk and air or a milk/air mixture, and a milk froth discharge pipe with a dispensing opening for dispensing the generated milk froth, and the milk intake line dips into the milk which is to be treated and which is located in the milk container.

The novel feature here is that at least the nozzle arrangement together with the negative-pressure chamber, milk container, milk intake line and milk froth discharge pipe, in a manner substantially fixedly connected to one another, form a milk-frothing apparatus which, overall, is in the form of a disposable part which is easy to dispose of after use and which is fastened to the steam supply line such that it can be easily exchanged.

A disadvantage of this likewise external solution is that the milk first has to be refilled, that the air supply cannot be controlled, and that the outlay in respect of production and material for this arrangement is comparatively high.

Finally, EP 1 374 748 A2 describes an automatic beverage machine having a chiller compartment for accommodating a chilled milk container, an emulsifying unit, which is based on a Venturi system, for emulsifying and discharging the milk. The chiller compartment is located above the emulsifying unit. An electrically operated flow control valve for the milk is arranged between the chiller compartment and the emulsifying unit. If the flow control valve is activated, the milk flows downward out of the storage container directly into the emulsifying unit due to gravity. It is noted in the description (paragraph [0014]) that the emulsifying unit can be in the form of a disposable part in order to simplify or save on cleaning.

One problem in this case is the manner in which the emulsifying unit is fastened, said emulsifying unit being simply plug-mounted and having to be connected to the flow control valve in a comparatively complicated manner.

SUMMARY OF THE INVENTION

The object of the invention is therefore to provide a milk-frothing apparatus which avoids the disadvantages of known milk-frothing apparatuses as far as possible and, in particular, is distinguished in that it firstly is easy to replace and secondly allows secure fastening and at the same time flexible froth generation.

A further object of the invention is to specify a coffee or espresso machine and an automatic beverage vending machine having a milk-frothing apparatus of this kind.

These and other objects are achieved by the features of claims 1, 17 and 18.

The invention is based on a milk-frothing apparatus, in particular for a coffee or espresso machine, comprising a froth-generating unit which is in the form of a disposable part or recyclable part, which is easy to replace, and has a mixing chamber, an outlet, which leads to the outside from the mixing chamber, for the generated milk froth, and first means through which the froth-generating unit is supplied with steam and air, and also second means through which the froth-generating unit is supplied with milk, wherein the froth-generating unit can be connected to a holding means in a releasable manner.

The invention is distinguished in that the first means comprise a first inlet through which steam and air enter the froth-generating unit together, in that a combined steam/air nozzle, which projects outward and is connected to a steam generator and an air pump and through which steam and air are routed together, is provided on the holding means, and in that the first inlet and the steam/air nozzle are designed and matched to one another such that they form a releasable hydraulic plug connection.

One refinement of the invention is characterized in that the hydraulic plug connection, which is formed from the first inlet and the steam/air nozzle, has a rotary locking means. This reliably prevents the froth-generating unit from being undesirably removed from the steam/air nozzle.

In this case, it is particularly advantageous when the hydraulic plug connection, which is formed from the first inlet and the steam/air nozzle, has latching means by means of which it can be releasably latched in the locked state.

Another refinement of the invention is distinguished in that the first inlet is in the form of a first pipe connection piece which is integrally formed on the mixing chamber. This creates space for locking and latching devices and other auxiliary devices which are advantageous for functioning of the apparatus.

A further refinement of the invention is characterized in that the second means comprise a second inlet which is in the form of a second pipe connection piece which projects radially from the first pipe connection piece. There is virtually no impedance of the actual hydraulic plug connection by this kind of milk supply.

A hose attachment onto which a milk hose is to be pushed is preferably integrally formed on the second pipe connection piece. In this way, the froth-generating unit and milk hose can, in a very simple manner, form a unit which can be used in a flexible manner and which can be disposed of after use.

The milk-frothing apparatus is particularly simple when the second pipe connection piece is part of a releasable latching apparatus.

The latching apparatus can then further comprise an elastic latching arm which is attached to the holding means and can engage in a latching manner with the second pipe connection piece when the hydraulic plug connection, which is formed from the first inlet and the steam/air nozzle, is locked in a rotary manner.

A yet further refinement of the milk-frothing apparatus according to the invention is characterized in that the froth-generating unit comprises a plastic injection-molded part which is produced in one piece and has a mixing chamber which is open at the top and is closed by a fitted cover. The production costs for the froth-generating unit are kept low in this way.

In addition, electrical switching means can be arranged on the holding means, said electrical switching means being operated when the hydraulic plug connection, which is formed from the first inlet and the steam/air nozzle, is releasably latched in the locked state. The correct position and state of the connection between the froth-generating unit and the holding means can be monitored and used for control purposes in a simple manner in this way.

In particular, an operating element for operating the electrical switching means can be arranged on the froth-generating unit.

The electrical switching means preferably comprise a microswitch.

According to another refinement, the rotary locking means comprises a holding element which is attached to the holding means and behind which the froth-generating unit engages by way of an integrally formed rotary bolt.

According to another refinement, means for rinsing the froth-generating unit are also provided. As a result, it is also possible to rinse the froth-generating unit and, as a result, defer replacement of the froth-generating unit as required.

In particular, the means for rinsing the froth-generating unit comprise a rinse line for supplying a rinsing medium, for example water, said rinse line being connected to the steam/air nozzle.

A further refinement is characterized in that a milk hose is provided for supplying the milk to the froth-generating unit, and in that the milk throughflow rate through the milk hose can be adjusted by a reduction nozzle which can be inserted into one end of the milk hose.

The coffee or espresso machine according to the invention and the automatic beverage vending machine according to the invention have a milk-frothing apparatus according to the invention, wherein, in particular, the milk-frothing apparatus is integrated in an outlet module of the automatic beverage vending machine.

BRIEF EXPLANATION OF THE FIGURES

The invention will be explained in greater detail below with reference to exemplary embodiments in connection with the drawing, in which.

WAYS OF IMPLEMENTING THE INVENTION

The present milk-frothing apparatus is usually part of a coffee or espresso machine and is used to heat and/or froth milk from a separate container as required in a manual or program-controlled manner, in order to use the generated milk froth to prepare a mixed beverage, for example a cappuccino.

Figure 1:
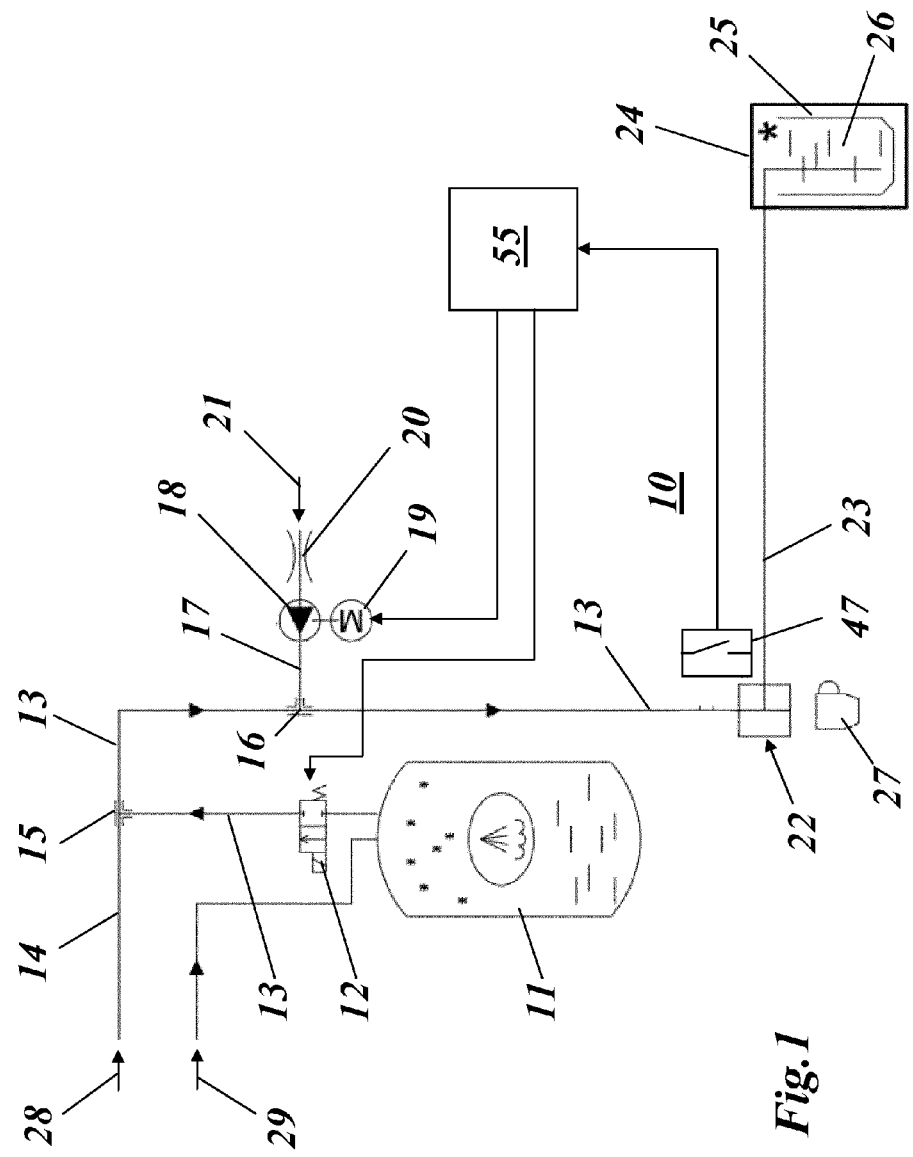
FIG. 1 shows a detail of an exemplary fluid diagram of a coffee or espresso machine which relates to the milk-frothing apparatus having a froth-generating unit.
Figure 2:
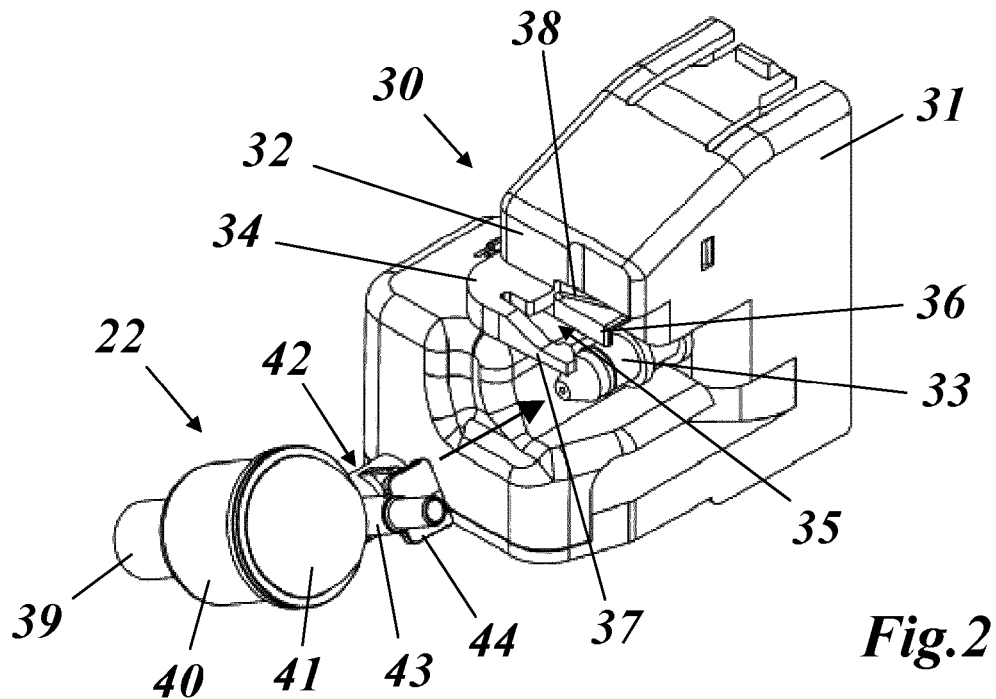
FIG. 2 shows a perspective side view of a froth-generating unit with an associated holding means (on the coffee or espresso machine) according to one exemplary embodiment of the invention before plug-connection or locking.
Figure 3:
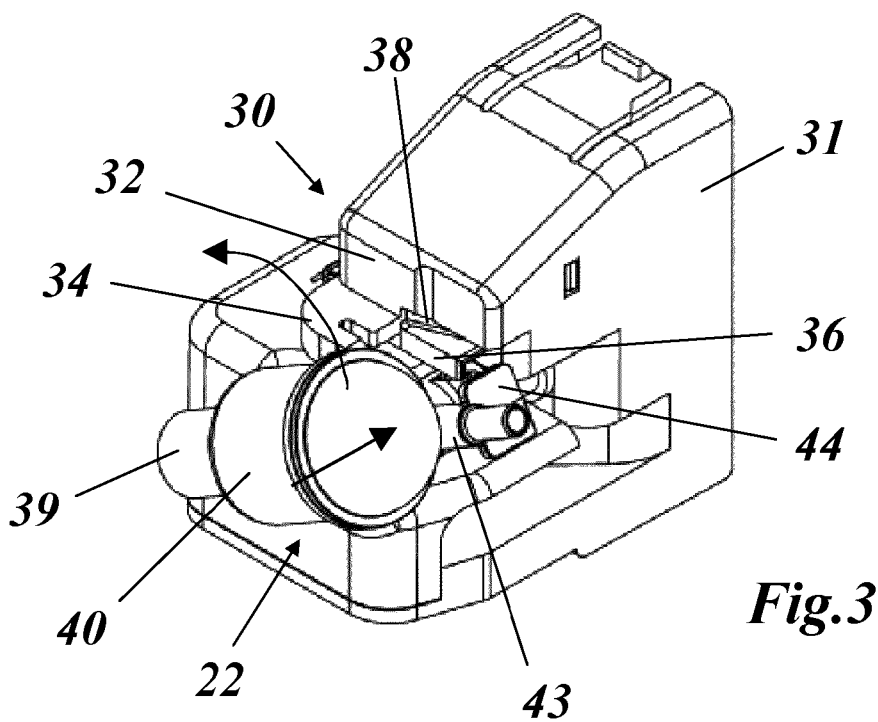
FIG. 3 shows a perspective side view of a froth-generating unit and holding means according to FIG. 2 at the moment at which locking takes place.
Figure 4:
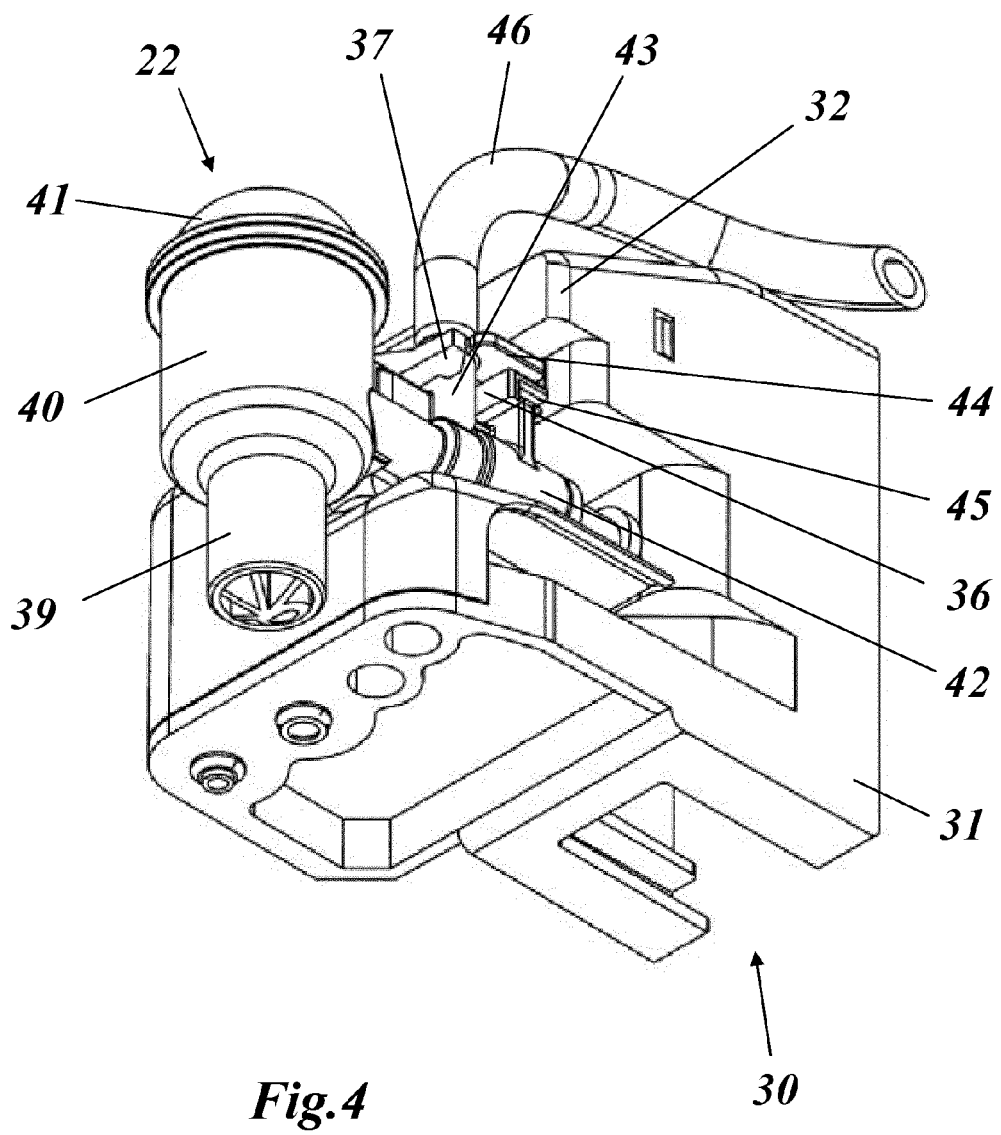
FIG. 4 shows a perspective view, obliquely from below, of the froth-generating unit which is locked in a latching manner in the holding means.

FIG. 1 shows a detail of an exemplary fluid diagram of a coffee or espresso machine of this kind which relates to a milk-frothing apparatus 10 having a froth-generating unit 22. The froth-generating unit 22 is connected to a steam generator 11 by means of a steam line 13 and is supplied with hot steam from said steam generator in a manner which can be controlled by means of a steam valve 12. A T-shaped piece 16 is incorporated into the steam lines 13, it being possible for compressed air to be admixed to the steam by means of said T-shaped piece, said compressed air being generated by an air pump 18 with a drive motor 19 and being supplied by means of a compressed-air line 17. Operation of the drive motor 19 is controlled by a control means 55 which, amongst other things, is also responsible for operation of the steam valve 12. Air 21 is drawn in by the air pump by means of a throttle apparatus 20 which can be adjusted. However, as an alternative to this, it is also feasible to dispense with the T-shaped piece 16 and to introduce the compressed air into the steam generator 11 directly or by means of the water supply, said air being admixed to the steam in said steam generator and exiting the steam generator 11 into the steam line 13 as a steam/air mixture.

A steam/air mixture, which is used in the froth-generating unit 23 to heat and froth the supplied milk, is formed in the steam line 13 downstream of the T-shaped piece 16 in the direction of flow. The generated milk froth is then dispensed into a mug or a cup 27. The milk is drawn out of a milk container 25, which is filled with milk 26 and which can be accommodated, for example, in a separate milk chiller 24, by suction by means of a milk line 23.

A rinse line 14 can issue into the steam line 13 by means of a further T-shaped piece 15, it being possible for a rinsing medium 28 with which the lines can be rinsed as required to be introduced from the outside by means of said rinse line. This results in the advantage that "cleaning" can take place during operation since the rinsing medium or water can enter the froth-generating unit by the same path as the steam. The steam generator 11 is supplied with water 29 by means of a further line, it being possible for said water to also originate from a further (not shown) hot water generator as hot water.

Figure 6:
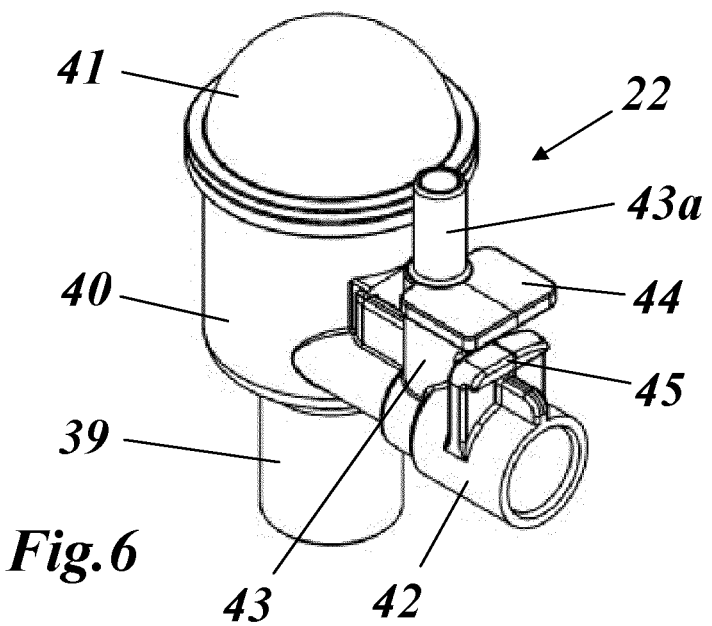
FIGS. 6-7 show the froth-generating unit of the exemplary embodiment on its own in a perspective illustration from two different viewing directions.
Figure 7:
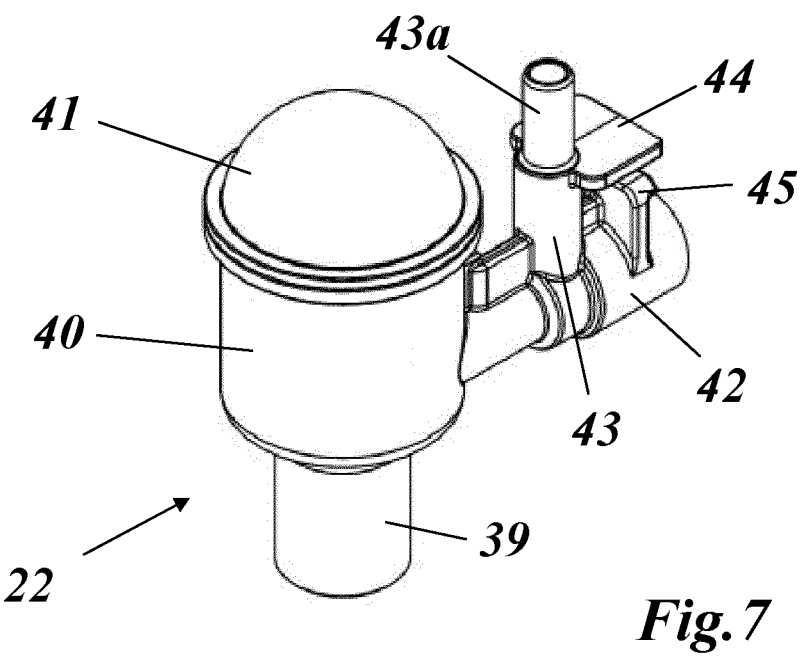

The froth-generating unit 22, which is in the form of a disposable part or recyclable part which can be easily exchanged and is illustrated separately in FIGS. 6 and 7, is connected to the coffee or espresso machine by means of a holding means 30 according to FIGS. 2-5 (the machine itself is not shown in the figures; the configuration may be similar to that shown in FIG. 1 of EP 1 374 748 A2 which is cited in the introductory part). The froth-generating unit 22 and holding means 30 are formed in such a way in this case that a fluid connection which can be easily released and at the same time held in a reliable manner can be established between said froth-generating unit and holding means in a quick and simple manner. To this end, both parts are designed in the manner of a hydraulic plug connection and, in order to be secured with a latching rotary locking means, provided with an electrical monitoring means which interrupts or prevents the supply of steam and/or air, for example by means of the control means 55, when incorrect positioning of the froth-generating unit 22 in the holding means 30 is detected.

In addition to the option of switching the electrical signal by means of the control means 55, it is also possible to interrupt the feed voltage of the steam valve 12 by means of an additional contact. This variant has an effect when it is necessary, for safety reasons, to prevent steam exiting, without a froth-generating unit 22 being fitted.

The froth-generating unit 22 has a mixing chamber 40 to the bottom of which an outlet 39 for the generated milk froth, in the form of a pipe connection piece, is connected. The mixing chamber 40 is closed at the top by a cover 41 which is in the form of a spherical cap and is adhesively bonded or welded on, but also can be mounted in a releasable manner. An inlet 42 in the form of a further pipe connection piece, which is part of the hydraulic plug connection, is integrally formed such that it projects laterally in the tangential direction from the mixing chamber 40. A further inlet 43, which is likewise in the form of a pipe connection piece and merges with a hose attachment 43*a*, projects radially from said inlet or pipe connection piece 42. According to FIGS. 4 and 5, a milk hose 46, which forms the milk line 23 and leads to the milk container 25, is connected to said inlet 43 or hose attachment 43*a*. The froth-generating unit 23 and the milk hose 46 form a unit which is replaced or disposed of or recycled as a whole or else in parts (either only the froth-generating unit or only the milk hose) after use.

A radially projecting rotary bolt 45, which for locking purposes engages behind an angled holding element 36 which is fitted to the holding means 30 (see FIG. 4), is likewise integrally formed on the pipe connection piece or inlet 42. The rotary bolt 45 is beveled on the top face at the front end, in order to make it easier to run in behind the holding element 36. The pipe connection piece or inlet 43 is at the same time part of a latching mechanism which also comprises a latching apparatus 34 which is integrally formed on the holding means 30. This latching apparatus 34 has an accommodation space 35 which extends tangentially to the plug connection, is bounded on one side by an elastic latching arm 37 and on the other side by the holding element 36, wherein the latching arm 37 surrounds the pipe connection piece 43 by way of an inwardly projecting lug in a latching manner (see FIG. 4) when said latching arm is rotated out of the starting position illustrated in FIG. 3, together with the rest of the froth-generating unit, into the blocking position (see rotary arrow in FIG. 3).

The hydraulic plug connection comprises, in addition to the inlet or pipe connection piece 42 on one side, a steam/air nozzle 33 on the other side, said steam/air nozzle extending outward from the holding means 30 in the plugging direction. The steam/air nozzle 33, which is clearly shown in FIG. 2 and FIG. 5, tapers in a conical manner at the front end. A central nozzle hole 50 is provided there, the steam/air mixture 53 which is supplied from the rear being injected through said central nozzle hole into the interior of the inlet 42. The emerging steam/air jet carries along milk by means of the milk hole 51 which issues into the interior at this point, said milk subsequently flowing by means of the milk hose 46 and being drawn in by suction. The joint stream of steam, air and milk then enters the adjoining mixing chamber 40 virtually tangentially by means of the injection channel 52 (FIG. 5) and there, owing to eddying and mixing, leads to a formation of heated milk froth which exits at the bottom by means of the outlet 39. Air can subsequently flow by means of a ventilation pipe 54 which is guided downward through the mixing chamber 40, so that the milk froth can largely flow out of the mixing chamber 40. In order to ensure defined and tight positioning of the inlet or pipe connection piece 42 on the steam/air nozzle 33, the nozzle is provided with a circumferential stop 48 and a seal 49, for example in the form of an O-ring which is placed in a groove.

Figure 5:
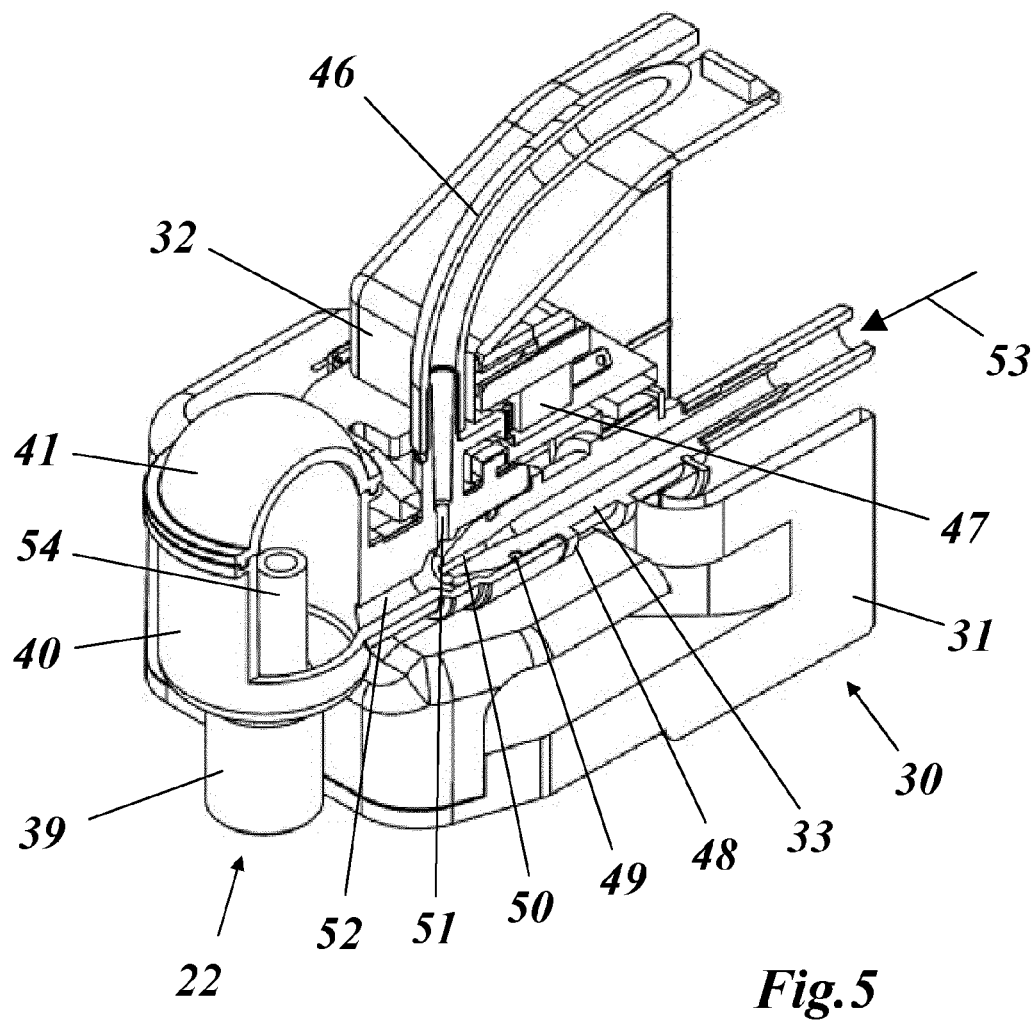
FIG. 5 shows the apparatus from FIG. 4 from a different viewing angle and partially in section.
Figure 5A:
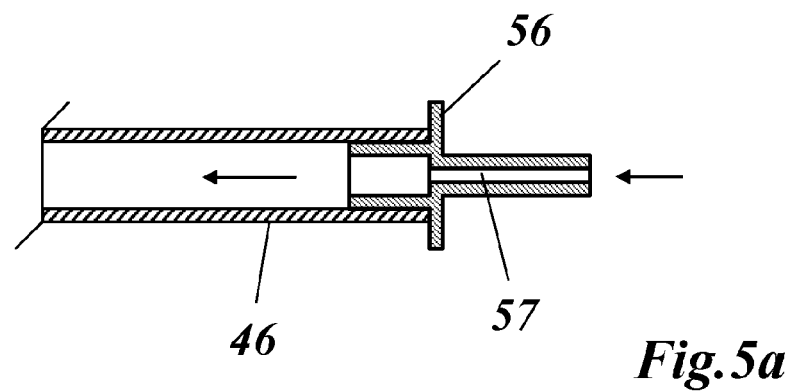
FIG. 5a shows a section through a reduction nozzle for adjusting the milk throughflow rate, which reduction nozzle is fastened or plug-mounted in a releasable manner on the container-side hose end of the milk hose.

According to FIG. 5*a*, reduction nozzle 56 can be fastened to that end of the milk hose 46 which is averted from the froth-generating unit 22. The reduction nozzle 56 is a one-piece plastic part which is inserted into the milk hose 46 and, by way of a nozzle hole 57 of a predetermined inside diameter, influences the milk throughflow rate during the intake process. One advantage of this reduction nozzle is that the temperature of the discharged milk can be influenced in a relatively simple manner by changing or adjusting the milk throughflow rate. Therefore, a set comprising the froth-generating unit 22, the milk hose 46 and the reduction nozzle 56 can be formed, it being possible for said set to be matched in a simple manner to different conditions (chilled or unchilled milk etc.). In particular, the reduction nozzle 56 can be part of a connection system which is matched to the respective milk container which can be in the form of a pouch or carton or some other container. However, it is also feasible for the froth-generating unit 22 to be connected to a milk container directly, that is to say without a separate milk hose.

Positioning of the froth-generating unit 22 in the holding means 30 such that it is locked in a reliably latching and operational manner is checked by a microswitch 47 which is connected to the control means 55 and is arranged in the holding means 30 behind the holding element 36 and can be operated by means of an operating lever 38 (FIG. 2) which projects obliquely above the holding element 36. In order to operate the microswitch 47, a plate-like operating element 44 which is integrally formed on the inlet 43 and is oriented tangentially in relation to the inlet 42 and runs onto the operating lever 38 during the locking movement according to FIG. 3 and presses said operating lever in the direction of the microswitch 47 is provided on the froth-generating unit 22.

The froth-generating unit 22 and/or the milk hose 46 can further be equipped with coding means (barcode, RFID and the like) which are identified by the machine and ensure that only specific replacement parts are used or parts which have already been used are not used again.

The use of the described froth-generating unit or a coffee machine with a froth-generating unit of this kind in conjunction with, for example, automatic beverage vending machines which are situated in public places, such as pedestrian zones or the like, and which can be serviced in as simple and reliable a manner as possible and by personnel who are not specially trained is particularly advantageous.

Figure 8:
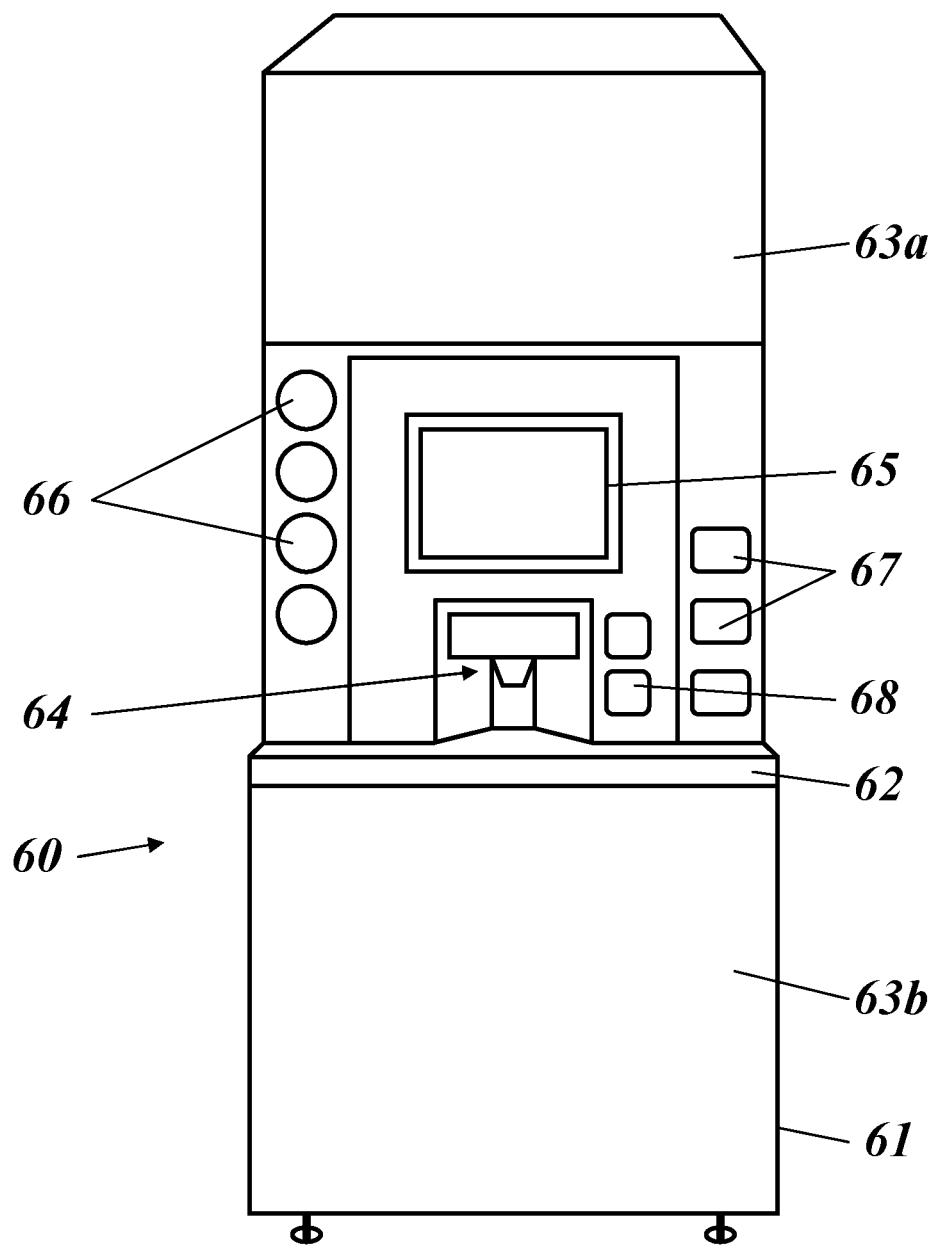
FIG. 8 shows a simplified illustration of an automatic beverage vending machine, which is particularly suited for the milk-frothing unit or froth-generating unit to be inserted, in a view from the front.

FIG. 8 shows a simplified illustration of a view of an exemplary automatic beverage vending machine 60 from the front, said automatic beverage vending machine being in the form of a kiosk for dispensing and paying for freshly brewed coffee-based beverages.

The automatic beverage vending machine 60 is accommodated in a housing 61 which has an upper part 63*a* and a lower part 63*b*, said parts being separated by a console 62 which forms a platform for discharging the beverage. The actual beverage discharge 64 is arranged in a recessed space above the console 62. An operator control/display unit 65 is arranged above the beverage discharge, said operator control/display unit being equipped, for example, with a touchscreen and being used to select and display the beverage which is to be prepared. Lateral cup shafts 66 from which cups for receiving the beverage can be removed are arranged on the left-hand side. Lateral compartments 67 in which sugar, spoons or the like can be stored are arranged on the right-hand side. A payment unit 68 which is used to pay for the selected beverage with coins or a smartcard is further provided. It goes without saying that the individual elements 64-68 can also be arranged differently, or other elements can be provided in addition or as an alternative.

The automatic beverage vending machine 60 according to FIG. 8 is provided with an advantageous internal structure which will be explained below with reference to FIG. 9.

Figure 9:
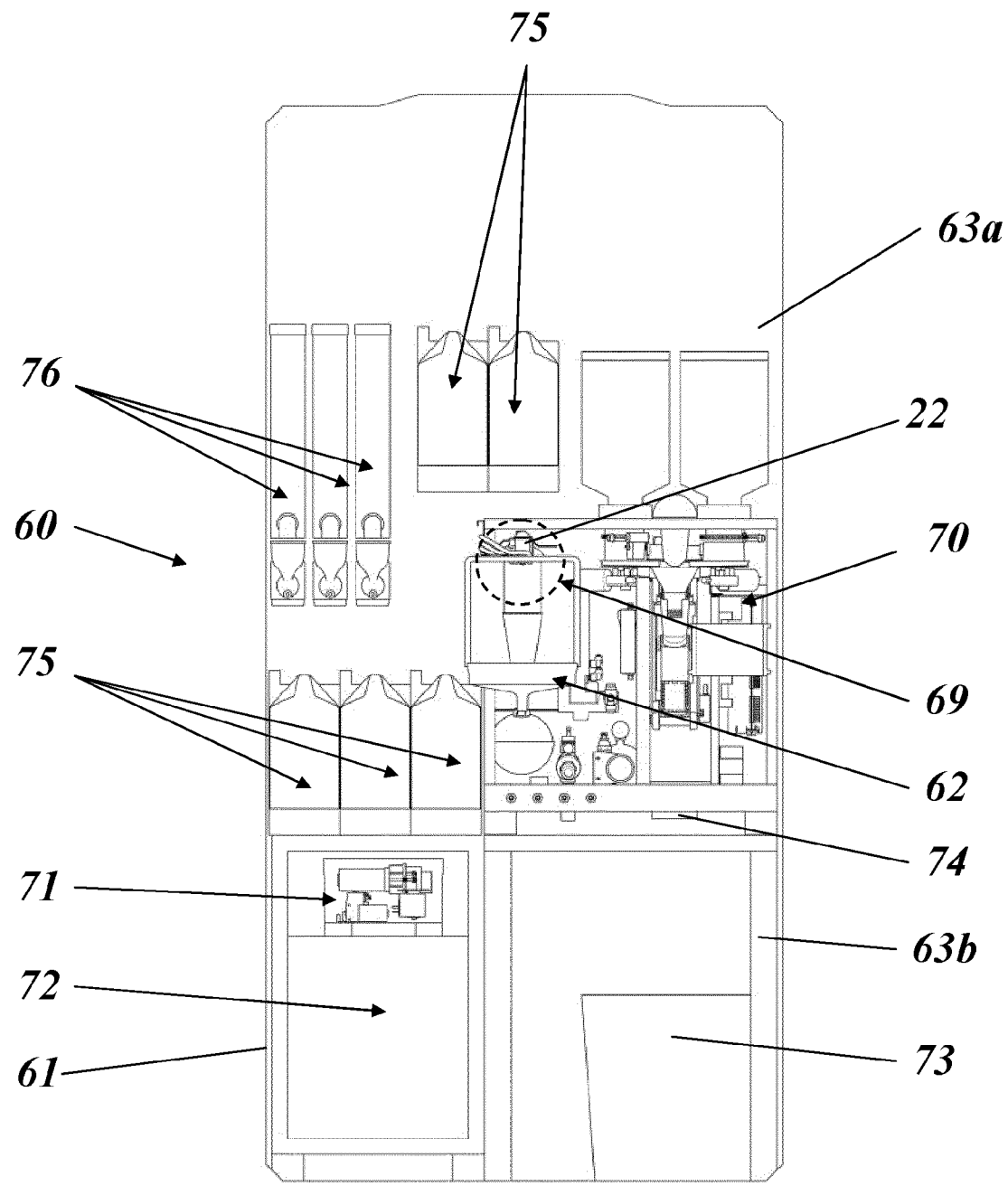
FIG. 9 shows the exemplary arrangement of various modules in the interior of an automatic beverage vending machine according to FIG. 8.

The central constituent part of the interior structure of the automatic beverage vending machine according to FIG. 9 is an inherently closed base module 70 in the form of a coffee machine which is designed to prepare a coffee beverage using freshly ground coffee. In addition to the base module 70, the basic equipment of the automatic machine includes an outlet module 69 (can be identified by a dashed circle in FIG. 9) which forms a fluid connection with the base module 20 and is responsible for discharging the coffee beverage into a cup 78 or the like which is situated beneath it. The froth-generating unit 22 can be seen within the outlet module 69. In contrast to conventional coffee machines, the outlet is not fixedly integrated into the machine (here: the base module), but rather formed separately as a module and therefore can be positioned independently. In this way, it is possible to move the base module 70—as can be identified in FIG. 2—in the automatic beverage vending machine out of the center to the side, this resulting in greater flexibility in respect of the configuration of the automatic machine.

In the automatic beverage vending machine according to FIG. 9, the base module 20 contains an operator control/control part for controlling beverage preparation, monitoring the automatic machine and the available supplies of powder, syrup, coffee beans etc. The operator control/control part can also be used to display that it is necessary to replace the froth-generating unit 22 after a prespecified operating time or at the end of a day, and to confirm that said replacement has been made. Furthermore, the base module contains a brewing unit which is provided for brewing coffee, and also with coffee grinders which interact with the brewing unit and with which different types of coffee can be ground and can be provided for preparing beverages. A drop opening 74 is positioned beneath the brewing unit, it being possible for the remaining coffee grounds to be expelled from the base module 70 into a relatively large coffee grounds container 73 which is situated beneath it after the brewing process comes to an end. The brewing unit is preferably in the form of a unit which is composed entirely of plastic, as is disclosed, for example, in WO 93/02605 A1 or WO 2009/027259 A2 or WO 2009/056426 A1.

In addition to the outlet module 69, further modules cooperate with the base module 70, are controlled by said base module and form a fluid connection with the latter or with the outlet module 69 or else with one another by a corresponding fluid interfaces. Five syrup modules 75, three powder modules 76 and one milk module are provided as further modules in the automatic beverage vending machine of FIG. 9. The syrup modules 75 form a fluid connection with the outlet module 69 and dispense predetermined quantities of syrup, for example, for flavoring the coffee beverage. The powder modules 76 keep ready beverage powders which are used, together with cold or hot water, to prepare other beverages such as tea or the like. The milk module 71 is arranged beneath the console in the lower part 63*b* of the automatic beverage vending machine and conveys milk from a milk container which is stored chilled in a chilling unit 72 which is situated beneath said milk module.

LIST OF REFERENCE SYMBOLS

10 Milk-frothing apparatus
11 Steam generator
12 Steam valve
13 Steam line
14 Rinse line
15, 16 T-shaped piece
17 Compressed-air line
18 Air pump
19 Drive motor
20 Throttle apparatus
21 Air
22 Froth-generating unit
23 Milk line
24 Milk chiller
25 Milk container
26 Milk
27 Mug or cup
28 Rinsing medium
29 Water (hot water)
30 Holding means
31 Main body
32 Overhang
33 Steam/air nozzle
34 Latching apparatus
35 Accommodation space
36 Holding element (angled)
37 Latching arm
38 Operating lever (microswitch)
39 Outlet
40 Mixing chamber
41 Cover
42, 43 Inlet
43*a* Hose attachment
44 Operating element
45 Rotary bolt
46 Milk hose
47 Microswitch
48 Stop
49 Seal
50 Nozzle hole
51 Milk hole
52 Injection channel
53 Steam/air mixture
54 Ventilation pipe
55 Control means
56 Reduction nozzle
57 Nozzle hole
60 Automatic beverage vending machine
61 Housing
62 Console
63*a* Upper part
63*b* Lower part
64 Beverage discharge
65 Operator control/display unit (for example touchscreen)
66 Cup shaft
67 Compartment
68 Payment unit
69 Outlet module
70 Base module
71 Milk module
72 Chilling unit
73 Coffee grounds container
74 Drop opening
75 Syrup module
76 Powder module

The invention claimed is:

1. A milk-frothing apparatus, for a coffee or espresso machine, comprising a froth-generating unit which is in the form of a disposable part or recyclable part, which is easy to replace, and has a mixing chamber, an outlet, which leads to the outside from the mixing chamber, for the generated milk froth, and means for supplying steam and air through which the froth-generating unit is supplied with steam and air, and also means for supplying milk through which the froth-generating unit is supplied with milk, wherein the froth-generating unit can be connected to a holding means in a releasable manner, characterized in that the means for supplying steam and air comprise a first inlet through which steam and air enter the froth-generating unit together, in that a combined steam/ air nozzle, which projects outward and is connected to a steam generator and an air pump and through which steam and air are routed together, is provided on the holding means, and in that the first inlet and the steam/air nozzle are designed and matched to one another such that they form a releasable hydraulic plug connection, characterized in that the first inlet is in the form of a first pipe connection piece which is integrally formed on the mixing chamber.

2. The milk-frothing apparatus as claimed in claim 1, characterized in that the hydraulic plug connection, which is formed from the first inlet and the steam/air nozzle, has a rotary locking means.

3. The milk-frothing apparatus as claimed in claim 2, characterized in that the hydraulic plug connection, which is formed from the first inlet and the steam/air nozzle, has latching means by means of which it can be releasably latched in the locked state.

4. The milk-frothing apparatus as claimed in claim 1, characterized in that the means for supplying milk comprises a second inlet which is in the form of a second pipe connection piece which projects radially from the first pipe connection piece.

5. The milk-frothing apparatus as claimed in claim 4, characterized in that a hose attachment onto which a milk hose is to be pushed is integrally formed on the second pipe connection piece.

6. The milk-frothing apparatus as claimed in claim 4, characterized in that the second pipe connection piece is part of a releasable latching apparatus.

7. The milk-frothing apparatus as claimed in claim 6, characterized in that the latching apparatus comprises an elastic latching arm which is attached to the holding means and can engage in a latching manner with the second pipe connection piece when the hydraulic plug connection, which is formed from the first inlet and the steam/air nozzle, is locked in a rotary manner.

8. The milk-frothing apparatus as claimed in claim 3, characterized in that electrical switching means are arranged on the holding means, said electrical switching means being operated when the hydraulic plug connection, which is formed from the first inlet and the steam/air nozzle, is releasably latched in the locked state.

9. The milk-frothing apparatus as claimed in claim 8, characterized in that an operating element for operating the electrical switching means is arranged on the froth-generating unit.

10. The milk-frothing apparatus as claimed in claim 8, characterized in that the electrical switching means comprise a microswitch.

11. The milk-frothing apparatus as claimed in claim 2, characterized in that the rotary locking means comprises a holding element which is attached to the holding means and behind which the froth-generating unit engages by way of an integrally formed rotary bolt.

12. The milk-frothing apparatus as claimed in claim 1, characterized in that the means for supplying milk comprises a milk hose for supplying the milk to the froth-generating unit, and in that the milk throughflow rate through the milk hose can be adjusted by a reduction nozzle which can be inserted into one end of the milk hose.

13. A coffee or espresso machine having a milk-frothing apparatus as claimed in claim 1.

14. An automatic beverage vending machine having a milk-frothing apparatus as claimed in claim 1.

15. The automatic beverage vending machine as claimed in claim 14, characterized in that the milk-frothing apparatus is integrated into an outlet module of the automatic beverage vending machine.

16. A milk-frothing apparatus, for a coffee or espresso machine, comprising a froth-generating unit which is in the form of a disposable part or recyclable part, which is easy to replace, and has a mixing chamber, an outlet, which leads to the outside from the mixing chamber, for the generated milk froth, and means for supplying steam and air through which the froth-generating unit is supplied with steam and air, and also means for supplying milk through which the froth-generating unit is supplied with milk, wherein the froth-generating unit can be connected to a holding means in a releasable manner, characterized in that the means for supplying steam and air comprise a first inlet through which steam and air enter the froth-generating unit together, in that a combined steam/air nozzle, which projects outward and is connected to a steam generator and an air pump and through which steam and air are routed together, is provided on the holding means, and in that the first inlet and the steam/air nozzle are designed and matched to one another such that they form a releasable hydraulic plug connection, characterized in that the froth-generating unit comprises a plastic injection-molded part which is produced in one piece and has the mixing chamber which is open at the top and is closed by a fitted cover.

17. A milk-frothing apparatus, for a coffee or espresso machine, comprising a froth-generating unit which is in the form of a disposable part or recyclable part, which is easy to replace, and has a mixing chamber, an outlet, which leads to the outside from the mixing chamber, for the generated milk froth, and means for supplying steam and air through which the froth-generating unit is supplied with steam and air, and also means for supplying milk through which the froth-generating unit is supplied with milk, wherein the froth-generating unit can be connected to a holding means in a releasable manner, characterized in that the means for supplying steam and air comprise a first inlet through which steam and air enter the froth-generating unit together, in that a combined steam/air nozzle, which projects outward and is connected to a steam generator and an air pump and through which steam and air are routed together, is provided on the holding means, and in that the first inlet and the steam/air nozzle are designed and matched to one another such that they form a releasable hydraulic plug connection, characterized in that means for rinsing the froth-generating unit are provided.

18. The milk-frothing apparatus as claimed in claim 17, characterized in that the means for rinsing the froth-generating unit comprise a rinse line for supplying a rinsing medium, said rinse line being connected to the steam/air nozzle.

\* \* \* \* \*